United States Patent Office 3,798,206
Patented Mar. 19, 1974

3,798,206
METHOD OF PRODUCING α-DIPEPTIDE ESTERS OF L-ASPARTIC ACID
Noboru Uchiyama, Naohiko Yasuda, and Tetsuo Yamatani, Kawasaki, Yasuo Ariyoshi and Koji Toi, Yokohama, and Naotake Sato, Tokyo, Japan, assignors to Ajinomoto Co., Inc., Tokyo, Japan
No Drawing. Filed Jan. 21, 1971, Ser. No. 108,555
Claims priority, application Japan, Jan. 31, 1970, 45/8,742; Feb. 23, 1970; 45/15,401; June 26, 1970, 45/55,722
Int. Cl. C07c 103/52; C07g 7/00; C08h 1/00
U.S. Cl. 260—112.5                                                                 10 Claims

ABSTRACT OF THE DISCLOSURE

α-Dipeptide lower alkyl esters of L-aspartic acid of the formula

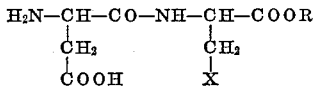

wherein R is lower alkyl, X is phenyl or p-hydroxyphenyl and the stereochemical configuration is L—L, are prepared by reacting a strong acid salt of L-aspartic anhydride with a lower alkyl ester of L-phenylalanine or L-tyrosine.

---

This invention relates to a method of producing α-dipeptide lower alkyl esters of L-aspartic acid. More particularly, this invention concerns a method of producing lower alkyl esters of α-L-aspartyl-L-phenylalanine and of α-L-aspartyl-L-tyrosine.

The dipeptide esters are known sweeteners having a taste closely similar to that of cane sugar (Belgian Pat. No. 717,373 and U.S. Pat. No. 3,475,403). They were prepared heretofore by reacting esters of L-phenylalanine or L-tyrosine with a derivative of L-aspartic acid in which the amino group and the β-carboxy group had been masked and the α-carboxy group had been converted to a reactive functional group. After the reaction, the masking groups had to be removed (see Dutch published application 6800870 and U.S. Pat. No. 3,475,403).

The known method requires many steps and various reagents, and its overall yield is low so that it is not suitable for an industrial application.

It has now been found that the desired α-dipeptide lower alkyl ester can be obtained directly in a high yield by reacting a strong acid salt of L-aspartic anhydride with a lower alkyl ester of L-phenylalanine or L-tyrosine. In the process of the present invention, neither the amino nor β-carboxy group of aspartic acid need to be masked. Thus, the method of this invention does not require many steps nor expensive reagents for masking the functional groups with protecting groups and removing the latter.

It has been known that generally both α- and β-aspartyl derivatives are formed by reacting an N-protected-aspartic anhydride with an amine, and that the β-aspartyl derivative is often formed in a larger quantity. The reaction of this invention yields α- and β-dipeptide lower alkyl esters simultaneously. However, the α-dipeptide ester is preferentially formed or the total yield of α- and β-dipeptide esters is very high. The β-dipeptide ester can be readily separated from the desired α-dipeptide ester. The lower alkyl esters of β-L-aspartyl-L-phenylalanine and of β-L-aspartyl-L-tyrosine have a weakly bitter taste and are not suitable as sweeteners.

In the method of this invention, a strong acid salt of L-aspartic anhydride is reacted with the methyl, ethyl, or propyl ester of L-phenylalanine or L-tyrosine. The esters of L-phenylalanine or L-tyrosine are usually employed in amounts of 1 mole or more, preferably 1.5–6 moles, per mole of the strong acid salt of L-aspartic anhydride. The reaction can be carried out in any solvent. Suitable solvents include, but are not limited to water; alcohols such as methanol, ethanol, propanol, butanol, ethylene glycol and triethylene glycol, ketones such as acetone, ethyl methyl ketone and diethyl ketone; acylic and cyclic ethers such as diethyl ether, dioxane and tetrahydrofuran; nitriles such as acetonitrile; esters such as ethyl acetate, butyl acetate, ethyl formate, methyl propionate and ethyl propionate; aliphatic halogenated hydrocarbons such as chloroform, dichloromethane, 1,2-dichloroethane, trichloroethylene and 1,1,2-trichloroethane; tertiary amines such as pyridine, picoline and quinoline; organic acids such as acetic acid and propionic acid; hydrocarbons such as benzene, toluene, xylene, hexane and cyclohexane; dimethylformamide; diethylsulfoxide, γ-butyrolactone; and nitromethane. A mixture of two or more of the above-mentioned solvents can also be used as a reaction medium.

The strong acids which constitute the acid moiety in the salt of L-aspartic anhydride include the following inorganic acids such as hydrogen chloride, hydrogen bromide, hydrogen iodide, chlorosulfonic acid, fluorosulfonic acid and sulfuric acid; and organic acids such as organic sulfonic acids, e.g., benzenesulfonic acid, p-toluenesulfonic acid and β-naphthalenesulfonic acid, and carboxylic acids, e.g., dichloroacetic acid, trichloroacetic acid and trifluoroacetic acid. Among the above strong acid salts of L-aspartic anhydride, the salts of strong organic acids are synthesized by reacting the corresponding salts of L-aspartic acid with acetic anhydride as disclosed in our simultaneously filed application Ser. No. 108,559.

The reaction may be carried out at any temperature because of the high reactivity of the strong acid salts of L-aspartic anhydride. The reaction proceeds even at ordinary temperature, and a temperature below 60° C. should normally be selected, because the reactants tend to racemize at very high temperature. A temperature below about 10° C. is preferably employed. At a lower temperature, the yield of the desired α-dipeptide ester often increases since the formation of the β-isomer and/or other by-products such as aspartyl aspartic acid, aspartyl phenylalanine and aspartyl tyrosine is repressed. The effect of lowering the reaction temperature on the formation of the desired α-dipeptide ester is significant especially in organic solvents.

Weak organic acids such as acetic acid, propionic acid and butryic acid, and tertiary amines such as pyridine and picoline may be used as solvents as mentioned above. Surprisingly it has been found that the yield of the desired α-dipeptide ester increases substantially when these organic acids and amines are used in a catalytical amount together with other solvents. The amount of these organic acids or amines is preferably below 10 moles per mole of the lower alkyl ester of L-phenylalanine or L-tyrosine used.

The reaction may be started by adding a strong acid salt of L-aspartic anhydride to a solution or suspension of a lower alkyl ester of L-phenylalanine or L-tyrosine with stirring. The reaction may also be started by adding a solution or suspension of a lower alkyl ester of L-phenylalanine or L-tyrosine to a solution or suspension of a strong acid of L-aspartic anhydride. The reaction generally is completed within 2 hours.

After the reaction, the solvent in the reaction mixture is evaporated in a vacuum and the residue is dissolved in water. The aqueous solution is adjusted to about pH 5 with sodium hydrogen carbonate, or a like neutralizing agent, and then mixed with a water-insoluble organic solvent which dissolves the lower alkyl ester of L-phenylalanine or L-tyrosine such as ethyl acetate or ethylene dichloride. The unreacted ester transfers to the organic layer and the dipeptide remains in the aqueous layer. The aqueous layer is evaporated in a vacuum to yield a mixture of α- and β-dipeptide esters.

The desired α-dipeptide ester can be separated from the β-isomer by recrystallization from water or from a mixture of water and organic solvents such as alcohols and ketones.

Separation of the lower alkyl ester of α-L-aspartyl-L-phenylalanine from the β-isomer is also possible by forming adducts insoluble in aqueous media with certain aromatic carboxylic acids or phenols such as cinnamic acid, β-resorcyclic acid, p-hydroxybenzoic acid, 5-chlorosalicyclic acid and 2,4-dichlorophenol. The adducts are decomposed into the components in a known manner.

The following examples illustrate the invention.

In every example, yields are based on the acid salt of L-asparitic anhydride used, and the α- and β-derivatives were determined by paper electrophoresis in aqueous acetic acid, pH 2.8 at 25 v./cm. The chromatogram was stained with cadmium-Ninhydrin reagent by the method of J. Heilmann et al. (Z. Physiol. Chem., 309, 219 (1957)). Two spots respectively corresponding to the α- and β-dipeptide esters were individually excised, eluted with methanol, and the absorbances of the eluates were measured at 510 mμ.

EXAMPLE 1

10.8 g. (0.05 mole) of L-phenylalanine methyl ester hydrochloride was suspended in 200 ml. ethyl acetate and 100 ml. water, and the suspension was neutralized by adding 4.6 g. (0.055 mole) of sodium bicarbonate. The ethyl acetate layer was dried with anhydrous sodium sulfate, and concentrated under reduced pressure.

The L-phenylalanine methyl ester obtained was dissolved in 100 ml. of ethyl acetate. To the resulting solution, 4.9 g. (0.025 mole) of L-aspartic anhydride hydrobromide was added at −50° C. with stirring which was continued for 40 minutes. After completion of the reaction, the reaction mixture containing precipitated crystals was mixed with 100 ml. of water to dissolve the crystals. The aqueous layer was adjusted to pH 5 and shaken vigorously, separated and concentrated under reduced pressure. On recrystallization of the solid residue from water, 6.1 g. of a mixture of α- and β-L-aspartyl-L-phenylalanine methyl ester was obtained. Yield: 80%. The ratio of α- and β-derivatives was 59:41.

The above-described crystalline mixture was dissolved in 300 ml. of water, stirred with 2.0 g. of cinnamic acid at room temperature for 5 hours, and kept in a refrigerator overnight. The adducts precipitated were collected by filtration and suspended in 300 ml. of water. The suspension was adjusted to pH 2 with hydrochloric acid, and liberated cinnamic acid was extracted with 150 ml. of ether.

The aqueous layer was concentrated under reduced pressure. On recrystallization of the solid residue from water, 2.52 g. of α-L-aspartyl-L-phenylalanine methyl ester was obtained. Yield: 33%.

The results of elementary analysis were:

Found (percent): C, 55.44; H, 6.31; N, 9.24. Calcd. for $C_{14}H_{18}O_5N_2 \cdot \frac{1}{2}H_2O$ (percent): C, 55.45; H, 6.27; N, 9.24.

The crystals were identified as pure α-derivative by their melting point (235–236° C.) and paper electrophoresis.

EXAMPLE 2

21.6 g. (0.10 mole) of L-phenylalanine methyl ester hydrochloride was dissolved in 100 ml. of water, and the solution was neutralized with 9.2 g. of sodium bicarbonate. The L-phenylalanine methyl ester was extracted with 150 ml. of ethylene dichloride. The extract was dried with anhydrous sodium sulfate, evaporated under reduced pressure, and the residue was dissolved in 200 ml. of a mixture of ethyl acetate and methanol (4:1, v./v.).

The solution was cooled to −20°—−30° C. and 13.7 g. (0.05 mole) of L-aspartic anhydride benzenesulfonate was added in 10 minutes with stirring. The reaction mixture was stirred furthermore for 45 minutes at −20°—−30° C., and then evaporated to remove the solvent under reduced pressure.

The resulting residue was dissolved in 300 ml. of water and the solution was adjusted to pH 5 with sodium hydrogen carbonate, and extracted with 100 ml. of ethylene dichloride to remove the unreacted L-phenylalanine methyl ester. The water layer was separated and evaporated to 50 ml. under reduced pressure. The precipitated crystals which appeared on keeping the concentrate in a refrigerator were separated by filtration. The separated crystals were recrystallized from water, giving 6.05 g. of α-L-aspartyl-L-phenylalanine methyl ester, which corresponded to a 38.9% yield. The melting point was 235–236° C.

The results of elementary analysis were:

Found (percent): C, 55.52; H, 6.28; N, 9.29. Calcd. for $C_{14}H_{18}O_5N_2 \cdot \frac{1}{2}H_2O$ (percent): C, 55.45; H, 6.27; N, 9.24.

The product was electrophoretically pure.

EXAMPLE 3

10.8 g. (50 mmoles) of L-phenylalanine methyl ester hydrochloride was dissolved in 100 ml. of water, and the solution was neutralized with 5.0 g. of triethylamine. 5.0 g. (25 mmoles) of L-aspartic anhydride hydrobromide was added to the resulting solution with stirring under ice-cooling, and the mixture was stirred for further 30 minutes. After the reaction, the solution was adjusted to pH 5 with sodium bicarbonate and washed with 50 ml. of ethyl acetate. The aqueous layer was separated and concentrated under reduced pressure. The solid residue obtained was recrystallized from water to yield α-L-aspartyl-L-phenylalanine methyl ester which melted at 234–236° C. Yield: 45%. $[\alpha]_D^{25} = +30.1°$ (c.=1, in acetic acid).

The results of elementary analysis were:

Found (percent): C, 55.54; H, 6.22; N, 9.38. Calcd. for $C_{14}H_{18}O_5N_2 \cdot \frac{1}{2}H_2O$ (percent): C, 55.45; H, 6.27; N, 9.24.

EXAMPLE 4

2.16 g. (10 mmoles) of L-phenylalanine methyl ester hydrochloride was dissolved in 20 ml. of each solvent shown in Table 1, and the solution was neutralized by adding 1.01 g. (10 mmoles) of triethylamine. 0.98 g. (5 mmoles) of L-aspartic anhydride hydrobromide was added to each resulting solution with stirring under ice-cooling, and the stirring was continued for additional 30 minutes.

The yields of α-L-aspartyl-L-phenylalanine are listed in Table 1.

TABLE 1

| Solvent (volume ratio) | Yield (percent) |
|---|---|
| Run Number: | |
| 1.  Water | 58.5 |
| 2.  Water-acetonitrile (1:3) | 55.5 |
| 3.  Water-dioxane (1:1) | 51.0 |
| 4.  Water-tetrahydrofuran (1:2) | 52.3 |
| 5.  Water-dimethylformamide (1:1) | 46.5 |
| 6.  Water-acetone (1:1) | 51.0 |
| 7.  Water-methanol (1:1) | 54.2 |
| 8.  Water-ethanol (1:1) | 53.8 |
| 9¹. Water-ethyleneglycol (2:3) | 65.0 |
| 10. Water-ethyl acetate (1:1) | 52.5 |

¹ This run was carried out under cooling with Dry Ice-methanol.

EXAMPLE 5

1.2 g. (5.5 mmoles) of L-phenylalanine methyl ester hydrochloride was dissolved in 20 ml. of water, and the solution was neutralized with 0.64 g. (5.5 mmoles) of sodium bicarbonate. 0.74 g. (5 mmoles) of L-aspartic anhydride hydrochloride was added to the resulting solution at room temperature with stirring. The reaction was continued for ten minutes with stirring. 0.71 g. of α-L-aspartyl-L-phenylalanine methyl ester was found in the reaction solution. Yield: 47%.

EXAMPLE 6

The procedure of Example 4, run No. 1 was repeated using 2.3 g. (10 mmoles) of L-phenylalanine ethyl ester hydrochloride instead of L-phenylalanine methyl ester hydrochloride. The yield of α-L-aspartyl-L-phenylalanine ethyl ester in the reaction mixture was 54%.

EXAMPLE 7

2.16 g. (10 mmoles) of L-phenylalanine methyl ester hydrochloride was suspended in 20 ml. ethyl-acetate and 10 ml. water, and the suspension was neutralized by adding 0.84 g. (10 mmoles) of sodium bicarbonate.

The ethyl acetate layer was dried with anhydrous sodium sulfate, and 0.98 g. (5 mmoles) of L-aspartic anhydride hydrobromide was added to the resulting solution with stirring at 20° C. The reaction was continued for 40 minutes with stirring. The yield of α-L-aspartyl-L-phenylalanine methyl ester was 39%.

When the reaction was repeated at −25° C., a 51% yield of the desired α-L-aspartyl-L-phenylalanine methyl ester was obtained.

EXAMPLE 8

2.16 g. (10 mmoles) of L-phenylalanine methyl ester hydrochloride was suspended in 20 ml. ethyl acetate and 100 ml. water, and the suspension was neutralized by adding 0.84 g. (10 mmoles) of sodium bicarbonate. The ethyl acetate layer was dried with anhydrous sodium sulfate, and concentrated under reduced pressure. The L-phenylalanine methyl ester obtained was dissolved in 20 ml. of each solvent shown in Table 2.

0.98 g. (5 mmoles) of L-aspartic anhydride hydrobromide was added to each resulting solution at the temperatures shown in Table 2 with stirring, and the stirring was continued for aditional 30 minutes. The yields of α- and β-L-aspartyl-L-phenylalanine methyl esters are listed in Table 2.

TABLE 2

| Run No. | Solvent | Reaction temp. (° C.) | Yield (percent) α-Isomer | β-Isomer |
|---|---|---|---|---|
| 1 | Methanol | −60 | 57 | 22 |
| 2 | Ethylene glycol | −40 | 38 | 32 |
| 3 | Isopropanol | −30 | 34 | 49 |
| 4 | Tetrahydrofuran | −25 | 57 | 21 |
| 5 | Chloroform | −40 | 39 | 55 |
| 6 | Acetonitrile | −35 | 36 | 45 |
| 7 | Acetone | −25 | 39 | 46 |
| 8 | Ethyl acetate-methanol (1:1) | −20 | 57 | 29 |
| 9 | Dimethylformamide | −20 | 37 | 57 |
| 10 | Toluene | −25 | 46 | 53 |
| 11 | Nitromethane | −15 | 36 | 48 |

EXAMPLE 9

1.08 g. (5 mmoles) of L-phenylalanine methyl ester hydrochloride was suspended in 20 ml. ethyl acetate and 10 ml. water, and the suspension was neutralized by adding 0.42 g. (5 mmoles) of sodium bicarbonate. The ethyl acetate layer was dried with anhydrous sodium sulfate, and concentrated under reduced pressure.

The L-phenylalanine methyl ester obtained was dissolved in 20 ml. of chloroform, and then 0.76 g. (5 mmoles) of L-aspartic anhydride hydrochloride was added to the resulting solution at −30° C. with stirring. The reaction was continued for one hour. The yields of α- and β-L-aspartyl-L-phenylalanine methyl ester were 35% and 48%, respectively.

EXAMPLE 10

The procedure of Example 7 was repeated at −10° C., using 2.3 g. (10 mmoles) of L-phenylalanine ethyl ester hydrochloride instead of L-phenylalanine methyl ester hydrochloride.

The yields of α- and β-L-aspartyl-L-phenylalanine ethyl ester were 35% and 59%, respectively.

EXAMPLE 11

2.16 g. (10 mmoles) of L-phenylalanine methyl ester hydrochloride was dissolved in 10 ml. of water, and the solution was neutralized with 0.90 g. of sodium bicarbonate. The L-phenylalanine methyl ester liberated was extracted with 25 ml. of ethylene dichloride. The extract was dried with anhydrous sodium sulfate and evaporated to dryness. The residue was dissolved in 40 ml. of each solvent listed in Table 3. To this solution, 1.37 g. (5 mmoles) of L-aspartic anhydride benzenesulfonate was added, and the reaction mixture was stirred for one hour at the temperature shown in Table 3. The yields of α- and β-L-aspartyl-L-phenylalanine methyl ester in the reaction mixture are also shown in Table 3.

TABLE 3

| Run No. | Solvent (volume ratio) | Reaction temp. (° C.) | Yield (percent) α-Isomer | β-Isomer |
|---|---|---|---|---|
| 1 | Water | 0∼+2 | 29.1 | 30.2 |
| 2 | Water-tetrahydrofuran (1:4) | −20∼−30 | 47.8 | 43.1 |
| 3 | Water-ethyl acetate (1:20) | −20∼−30 | 51.4 | 46.2 |
| 4 | Water-acetone (1:10) | −20∼−30 | 49.8 | 47.4 |
| 5 | Water-dimethylformamide (1:10) | −20∼−30 | 45.6 | 46.4 |
| 6[1] | Methanol | −40∼−50 | 50.2 | 45.2 |
| 7 | Acetone | −20∼−30 | 47.5 | 46.2 |
| 8[1] | Acetonitrile | −5∼−10 | 45.6 | 48.4 |
| 9 | Toluene | −5∼−10 | 41.5 | 39.8 |
| 10[1] | Ethylenedichloride | −5∼−10 | 44.4 | 43.8 |
| 11[1] | Ethyl acetate | −20∼−30 | 49.2 | 49.4 |
| 12 | do | +25∼+30 | 47.4 | 48.5 |
| 13 | Ethyl acetate-methanol (4:1) | −20∼−30 | 49.4 | 48.6 |
| 14 | do | 0∼+5 | 48.4 | 48.6 |
| 15 | do | +25∼+30 | 47.3 | 47.9 |

[1] In these runs, 4.32 g. (20 mmoles) of L-phenylalanine methyl ester and 1.08 g. of sodium bicarbonate were used.

EXAMPLE 12

The procedures of Example 11 were repeated using 2.28 g. (10 mmoles) of L-phenylalanine ethyl ester hydrochloride instead of L-phenylalanine methyl ester hydrochloride. The results are summarized in Table 4.

TABLE 4

| Run No. | Solvent (volume ratio) | Reaction temp. (° C.) | Yield of α-isomer (percent) |
|---|---|---|---|
| 1 | Methanol | −40∼−50 | 44.4 |
| 2 | Tetrahydrofuran | −20∼−30 | 45.4 |
| 3 | Acetone | −20 to −30 | 42.1 |
| 4 | Ethyl acetate | −20 to −30 | 48.5 |
| 5 | Ethyl acetate-methanol (4:1) | −20∼−30 | 48.4 |

EXAMPLE 13

The procedures of Example 11 were repeated using 1.78 g. (5 mmoles) of L-aspartic anhydride p-toluenesulfonate instead of L-aspartic anhydride benzenesulfonate. The results are summarized in Table 5.

TABLE 5

| Run No. | Solvent (volume ratio) | Reaction temp. (° C.) | Yield (percent) α-Isomer | β-Isomer |
|---|---|---|---|---|
| 1 | Methanol | −40 to −50 | 41.4 | 39.6 |
| 2 | Dioxane | −10 to −20 | 43.6 | 44.2 |
| 3 | Acetonitrile | −10 to −20 | 45.4 | 41.8 |
| 4 | Ethyl acetate | −10 to −20 | 49.2 | 43.9 |
| 5 | Ethyl acetate-methanol (4:1) | −20 to −30 | 49.2 | 42.9 |

EXAMPLE 14

10 mmoles of L-tyrosine ester hydrochloride was suspended in 20 ml. ethyl acetate and 10 ml. water, and the suspension was neutralized by adding 0.84 g. (10 mmoles) of sodium bicarbonate.

The ethyl acetate layer was separated and the aqueous layer was extracted with another 20 ml. of ethyl acetate. The combined extracts were dried with anhydrous sodium sulfate and evaporated under reduced pressure. The residue was dissolved in 40 ml. of each solvent listed in Table 6. 0.76 g. (5 mmoles) of L-aspartic anhydride hydrochloride was added to the resulting solution with stirring at the temperature shown in Table 6. The reaction was continued for 40 minutes with stirring.

Table 6 shows the yields of α-L-aspartyl-L-tyrosine ester and the β-isomer.

TABLE 6

| Run No. | Solvent | Reaction temp. (° C.) | Yield (percent) | |
|---|---|---|---|---|
| | | | α-Isomer | β-Isomer |
| 1 | Acetone | −30 | 24 | 44 |
| 2 | Dimethylformamide | −25 | 32 | 39 |
| 3 | Water | +5 | 20 | 35 |
| 4 | Tetrahydrofuran-water (9:1, v./v.) | −25 | 45 | 23 |
| 5 | Methanol | −50 | 62 | 33 |
| 6 | Ethyl acetate | −35 | 48 | 45 |
| 7 | Chloroform | −25 | 43 | 29 |
| 8 | Acetonitrile | −25 | 38 | 41 |

NOTE.—In Run Nos. 1–4, L-tyrosine methyl ester hydrochloride was employed, and in Run Nos. 5–8, L-tyrosine ethyl ester hydrochloride. In Run No. 4, the used amount of L-tyrosine methyl ester hydrochloride was 5 millimoles.

EXAMPLE 15

1.3 g. (5.5 mmoles) of L-tyrosine methyl ester hydrochloride was suspended in 18 ml. tetrahydrofuran and 20 ml. water, and then was neutralized with 0.56 g. (5.5 mmoles) of triethyl amine.

To the resulting solution was added 0.98 g. (5 mmoles) of L-aspartyl anhydride hydrobromide with stirring at −25° C. The stirring was continued for additional 40 minutes at the above-mentioned temperature. The yields of α- and β-L-aspartyl-L-tyrosine methyl ester were 0.77 g. (50%) and 0.34 g. (22%), respectively.

EXAMPLE 16

12.3 g. (0.05 mole) of L-tyrosine ethyl ester hydrochloride was suspended in 200 ml. ethyl acetate and 100 ml. water, and then neutralized with 4.6 g. (0.055 mole) of sodium bicarbonate. The ethyl acetate layer was dried with anhydrous sodium sulfate, and concentrated under reduced pressure. L-tyrosine ethyl ester obtained was dissolved in 20 ml. of methanol. 3.8 g. (0.025 mole) of L-aspartic anhydride hydrochloride was added to the resulting solution at −25° C. with stirring. The reaction was continued for 45 minutes. The reaction mixture was evaporated under reduced pressure and the residue was dissolved in 100 ml. of water. After being adjusted to pH 5.1 and washed with 100 ml. of ethyl acetate, the solution was evaporated to dryness. The solid residue was recrystallized from water to obtain 3.4 g. (yield: 42%) of crystals. The crystals melted twice at 179–180° C. and 218° C.

By their melting points, infrared spectroscopy and paper electrophoresis analysis, the crystals were identified as pure α-L-aspartyl-L-tyrosine ethyl ester.

EXAMPLE 17

11.8 g. (0.05 mole) of L-tyrosine methyl ester hydrochloride was suspended in 200 ml. ethyl acetate and 100 ml. water, and then neutralized with 4.6 g. (0.055 mole) of sodium bicarbonate. The ethyl acetate layer was dried with anhydrous sodium sulfate and evaporated under reduced pressure to obtain the crystals of L-tyrosine methyl ester.

The crystals were dissolved in 200 ml. of pyridine. 3.8 g. (0.025 mole) of L-aspartic anhydride hydrochloride was added to the pyridine solution with stirring at −25° C. The reaction was carried out for 1 hour with stirring at the above-mentioned temperature. After the reaction, the solvent was distilled off under reduced pressure and the residue was dissolved in 100 ml. of water. The solution was adjusted to pH 5.0 and washed with 100 ml. of ethyl acetate. The solution was evaporated to dryness. 3.7 g. (yield: 48%) of crystals was obtained by recrystallizing the residual solid substance from water.

The crystals exhibited double melting points of 178° C. and 222–223° C.

The crystals were identified as pure α-L-aspartyl-L-tyrosine methyl ester by their infrared spectrum, melting points and paper electrophoresis.

EXAMPLE 18

4.32 g. (20 mmoles) of L-phenylalanine methyl ester hydrochloride was dissolved in 20 ml. of water and the solution was neutralized with 1.80 g. of sodium bicarbonate. L-phenylalanine methyl ester was liberated and extracted with 50 ml. of ethylenedichloride. The extract was dried with anhydrous sodium sulfate and evaporated to drynes. The resulted residue was dissolved in 40 ml. of each solvent listed in Table 7. To each solution was added 1.37 g. (5 mmoles) of L-aspartic anhydride benzenesulfonate and stirred for 30 minutes at the temperature shown in Table 7. The yields of α- and β-L-aspartyl-L-phenylalanine methyl ester are also shown in Table 7.

TABLE 7

| Run No. | Solvent (volume ratio) | Molar ratio of acid or amine to the ester | Reaction temp. (° C.) | Yield (percent) | |
|---|---|---|---|---|---|
| | | | | α-isomer | β-isomer |
| 1 | Acetone-acetic acid (38.8:1.2) | 1.0 | +25 | 60.0 | 37.0 |
| 2 | do | 1.0 | −25 | 66.4 | 33.7 |
| 3 | Ethyl acetate-acetic acid (37.6:2.4) | 2.0 | 0 | 76.0 | 22.5 |
| 4 | Ethyl acetate-propionic acid (37.0:3.0) | 2.0 | −5 | 73.0 | 15.8 |
| 5 | Ethyl acetate-methanol-acetic acid (34.8:4.0:1.2) | 1.0 | −20 | 74.5 | 19.2 |
| 6 | Ethyl acetate-ethanol-propionic acid (34.5:4.0:1.5) | 1.0 | −20 | 71.2 | 15.9 |
| 7 | Ethylenedichloride-water-acetic acid (36.8:2.0:1.2) | 1.0 | −25 | 70.2 | 24.9 |
| 8 | Ethyl acetate-pyridine (38.5:1.5) | 1.0 | +10 | 61.4 | 24.5 |
| 9 | Ethyl acetate-methanol-pyridine (33.0:4.0:3.0) | 2.0 | −30 | 78.1 | 18.4 |
| 10 | Ethylenedichloride-picoline (38.0:2.0) | 1.0 | −30 | 73.8 | 21.4 |
| 11 | Ethylenedichloride-methanol-picoline (32.0:4.0:4.0) | 2.0 | −30 | 72.8 | 22.5 |

EXAMPLE 19

The same procedure as in Example 18 was repeated using 0.74 g. (5 mmoles) of L-aspartic anhydride hydrochloride instead of L-aspartic anhydride benzenesulfonate. The results are summarized in Table 8.

TABLE 8

| Run No. | Solvent (volume ratio) | Molar ratio of acid or amine to the ester | Reaction temp. (° C.) | Yield (percent) | |
|---|---|---|---|---|---|
| | | | | α-isomer | β-isomer |
| 1 | Ethylenedichloride-acetic acid (37.6:2.4) | 2.0 | −20 | 64.6 | 28.2 |
| 2 | Ethylenedichloride-methanol-acetic acid (34.8:4.0:1.2) | 1.0 | −30 | 73.6 | 21.8 |
| 3 | Ethylenedichloride-methanol-propionic acid (34.5:4.0:1.5) | 1.0 | −30 | 71.8 | 20.9 |
| 4 | Ethyl acetate acetic acid (37.6:2.4) | 2.0 | −10 | 64.3 | 29.4 |
| 5 | Ethylcetate-methanol-propionic acid (34.5:4.0:1.5) | 1.0 | −30 | 74.8 | 20.4 |
| 6 | Ethylenedichloride-methanol-pyridine (37.0:3.0) | 2.0 | −30 | 72.4 | 24.3 |
| 7 | Ethyl acetate-methanol-picoline (34.8:4.0:2.0) | 1.0 | −30 | 73.2 | 23.8 |

What we claim is:
1. A method of preparing an α-peptide ester of L-aspartic acid of the formula

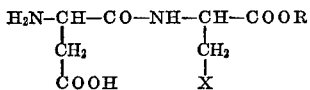

wherein R is methyl or ethyl, X is phenyl or p-hydroxyphenyl, and the stereochemical configuration is L—L, which comprises:
(a) reacting a strong acid salt of L-aspartic anhydride with 1 mole to 6 moles of a methyl or ethyl ester of L-phenylalanine or L-tyrosine per mole of said salt,
  (1) said strong acid being at least as strong as dichloroacetic acid; and
(b) recovering the α-dipeptide ester of L-aspartic acid formed thereby.

2. A method as set forth in claim 1, wherein said salt of L-aspartic acid anhydride is reacted with said ester of L-phenyl-alanine or L-tyrosine while said ester is dissolved in a solvent and in the presence of an amount of a compound selected from the group consisting of weak organic acids and tertiary amines, said compound being different from said solvent, and said amount being sufficient to increase the yield of said α-peptide ester, but not greater than ten moles per mole of said ester of L-phenylalanine or L-tyrosine.

3. A method as set forth in claim 2, wherein said compound is a weak organic acid.

4. A method as set forth in claim 2, wherein said compound is a tertiary amine.

5. A method as set forth in claim 1, wherein said strong acid is an inorganic acid.

6. A method as set forth in claim 5, wherein said inorganic acid is a hydrogen halide or an inorganic sulfonic acid.

7. A method as set forth in claim 1, wherein said strong acid is an organic acid.

8. A method as set forth in claim 7, wherein said organic acid is an organic sulfonic acid or strong carboxylic acid.

9. A method as set forth in claim 1, wherein said salt is reacted with said ester at a temperature lower than 60° C.

10. A method as set forth in claim 9, wherein said temperature is not higher than 10° C.

References Cited

Grant et al.: J. Am. Chem. Soc., 86, 3870 (1964).
Denkewalter et al.: J. Am. Chem. Soc., 88, 3163 (1966).
Knobler et al.: J. Chem. Soc., 1964, 3941.
W. J. Le Quesne and G. T. Young: J. Chemical Society (London), 1952, p. 24.
J. Kovacs, H. N. Kovacs, and R. Ballina: J. Am. Chem. Soc., vol. 85, 1963, p. 1839.
E. Fischer: Berichte, vol. 38, p. 2914 (1905).

LEWIS GOTTS, Primary Examiner

R. J. SUYAT, Assistant Examiner

UNITED STATES PATENT OFFICE
CERTIFICATE OF CORRECTION

Patent No. 3,798,206    Dated March 19, 1974

Inventor(s) NOBORU UCHIYAMA ET AL

It is certified that error appears in the above-identified patent and that said Letters Patent are hereby corrected as shown below:

In the heading, line 8 after the title, after "45/55,722"

insert: -- ; Dec. 30, 1970, 128,706/1970 --

Signed and sealed this 30th day of Jyly 1974.

(SEAL)
Attest:

McCOY M. GIBSON, JR.
Attesting Officer

C. MARSHALL DANN
Commissioner of Patents